US012099952B2

(12) United States Patent
Cobo et al.

(10) Patent No.: US 12,099,952 B2
(45) Date of Patent: Sep. 24, 2024

(54) COMPUTER VISION SYSTEMS AND METHODS FOR DETECTING POWER LINE HAZARDS FROM IMAGERY

(71) Applicant: Insurance Services Office, Inc., Jersey City, NJ (US)

(72) Inventors: Antonio Godino Cobo, South Jordan, UT (US); Rocío Expósito, Madrid (ES); Kevin Black, Highland, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 366 days.

(21) Appl. No.: 17/668,040

(22) Filed: Feb. 9, 2022

(65) Prior Publication Data

US 2022/0261713 A1    Aug. 18, 2022

Related U.S. Application Data

(60) Provisional application No. 63/147,292, filed on Feb. 9, 2021.

(51) Int. Cl.
*G06V 20/70* (2022.01)
*G06Q 10/0635* (2023.01)
(Continued)

(52) U.S. Cl.
CPC ......... *G06Q 10/0635* (2013.01); *G06Q 50/06* (2013.01); *G06V 20/182* (2022.01); *G06V 20/188* (2022.01); *G06V 20/70* (2022.01)

(58) Field of Classification Search
CPC ..... G06V 20/70; G06V 20/182; G06V 20/188
See application file for complete search history.

(56) References Cited

U.S. PATENT DOCUMENTS

2020/0155882 A1    5/2020   Tohidi et al.

FOREIGN PATENT DOCUMENTS

CN    111160236 A    5/2020
WO    2017/021751 A1   2/2017

OTHER PUBLICATIONS

International Search Report of the International Searching Authority mailed on May 23, 2022, issued in connection with International Application No. PCT/US22/15792 (3 pages).
(Continued)

*Primary Examiner* — Sam Bhattacharya
(74) *Attorney, Agent, or Firm* — McCarter & English, LLP

(57) ABSTRACT

Computer vision systems and methods for detecting power line hazards from imagery are provided. The system obtains at least one image from an image database having an object and/or a structure present therein, and generates a digital surface model (DSM), a vegetation mask, and a three-dimensional (3D) power line model based on the obtained image. The system generates a digital line model based on the 3D power line and a risk distance indicative of a distance between the 3D power line and vegetation proximate to the 3D power line, and also generates a digital tree model. The system generates a digital difference model based on an intersection of the digital line model and the digital tree model, identifies sections of a power line within a risk distance of vegetation located proximate to the power line based on the digital difference model, and generates a vegetation risk report based on the identified sections of the power line, the predetermined 2D risk distance, a predetermined 3D risk distance, and an elevation risk distance.

46 Claims, 12 Drawing Sheets

(51) Int. Cl.
*G06Q 50/06* (2012.01)
*G06V 20/10* (2022.01)

(56) References Cited

OTHER PUBLICATIONS

Written Opinion of the International Searching Authority mailed on May 23, 2022, issued in connection with International Application No. PCT/US22/15792 (5 pages).

100

120  122  124

| Risk | Length Feet |
|---|---|
| Critical | 8,329 |
| High Risk | 7,546 |
| Low Risk | 9,182 |
| No Risk | 85,059 |

COMPUTER VISION SYSTEMS AND METHODS FOR DETECTING POWER LINE HAZARDS FROM IMAGERY

RELATED APPLICATIONS

The present application claims the priority of U.S. Provisional Application Ser. No. 63/147,292 filed on Feb. 9, 2021, the entire disclosure of which is expressly incorporated herein by reference.

BACKGROUND

Technical Field

The present disclosure relates generally to the field of computer modeling of structures. More particularly, the present disclosure relates to computer vision systems and methods for detecting power line hazards from imagery.

Related Art

Accurate and rapid identification and depiction of objects and/or structures from digital images (e.g., aerial images, satellite images, etc.) is increasingly important for a variety of applications. For example, information related to various features of buildings, such as roofs, walls, doors, etc., is often used by construction professionals to specify materials and associated costs for both newly-constructed structures (e.g., buildings), as well as for replacing and upgrading existing structures. In another example, information related to vegetation is often used by the utility industry to identify vegetation (e.g., trees) proximate to a power line and to mobilize a utility crew to trim and/or cut the vegetation proximate to the power line. Traditionally, vegetation management is a manually intensive and expensive task that accounts for a large expenditure for many utility companies.

Various software systems have been implemented to process ground images, aerial images and/or overlapping image content of an aerial image pair to generate a three-dimensional (3D) surface model of the image and/or 3D models of the objects and/or structures present in the images. However, these systems can be computationally expensive and have drawbacks, such as missing camera parameter information associated with each ground and/or aerial image and an inability to provide a higher resolution estimate of a position of each aerial image (where the aerial images overlap) to provide a smooth transition for display. Moreover, such systems often require onsite manual inspection by an individual to determine respective geometries and features of the objects and/or structures (e.g., a power line, a power line tower, a transformer, a fence, etc.) and a proximity of vegetation (e.g., trees) to the objects and/or structures and a modeler (e.g., a user) to generate accurate models of the objects and/or structures and vegetation. As such, the ability to determine a proximity of vegetation to a power line, as well as generate a report of attributes of the power line and vegetation and risks of the vegetation contacting the power line, without first performing an onsite manual inspection, is a powerful tool.

Thus, what would be desirable is a system that automatically and efficiently determines proximity of vegetation to power lines and generates reports of attributes of the power lines, vegetation, and risks of the vegetation contacting the power lines without requiring onsite manual inspections. Accordingly, the computer vision systems and methods disclosed herein solve these and other needs.

SUMMARY

The present disclosure relates to computer vision systems and methods for detecting power line hazards from imagery. The system obtains at least one image from an image database having an object and/or a structure (e.g., a power line, a power line tower, vegetation, etc.) present therein based on a received geospatial region of interest. The system generates a digital surface model (DSM), a vegetation mask, and a three-dimensional (3D) power line model based on the obtained image. The system generates a digital line model based on the 3D power line and a predetermined two-dimensional (2D) risk distance indicative of a distance between the 3D power line and vegetation (e.g., tree coverage) proximate to the 3D power line. The system also generates a digital tree model. Subsequently, the system generates a digital difference model based on an intersection of the digital line model and the digital tree model. The system identifies sections of a power line within a risk distance of vegetation located proximate to the power line based on the digital difference model and generates a vegetation risk report based on the identified sections of the power line, the predetermined 2D risk distance, a predetermined 3D risk distance, and an elevation risk distance. The vegetation risk report can include information associated with a risk to a power line due to vegetation located proximate to the power line including, but not limited to, a location of the risk, a distance of a tree and/or tree coverage to the power line, and an estimated severity of the risk. Additionally, the system can forecast a vegetation risk and generate a power line tower condition report.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for detecting power line hazards from imagery, as described in detail below in connection with FIGS. 1-14.

Figure 1:
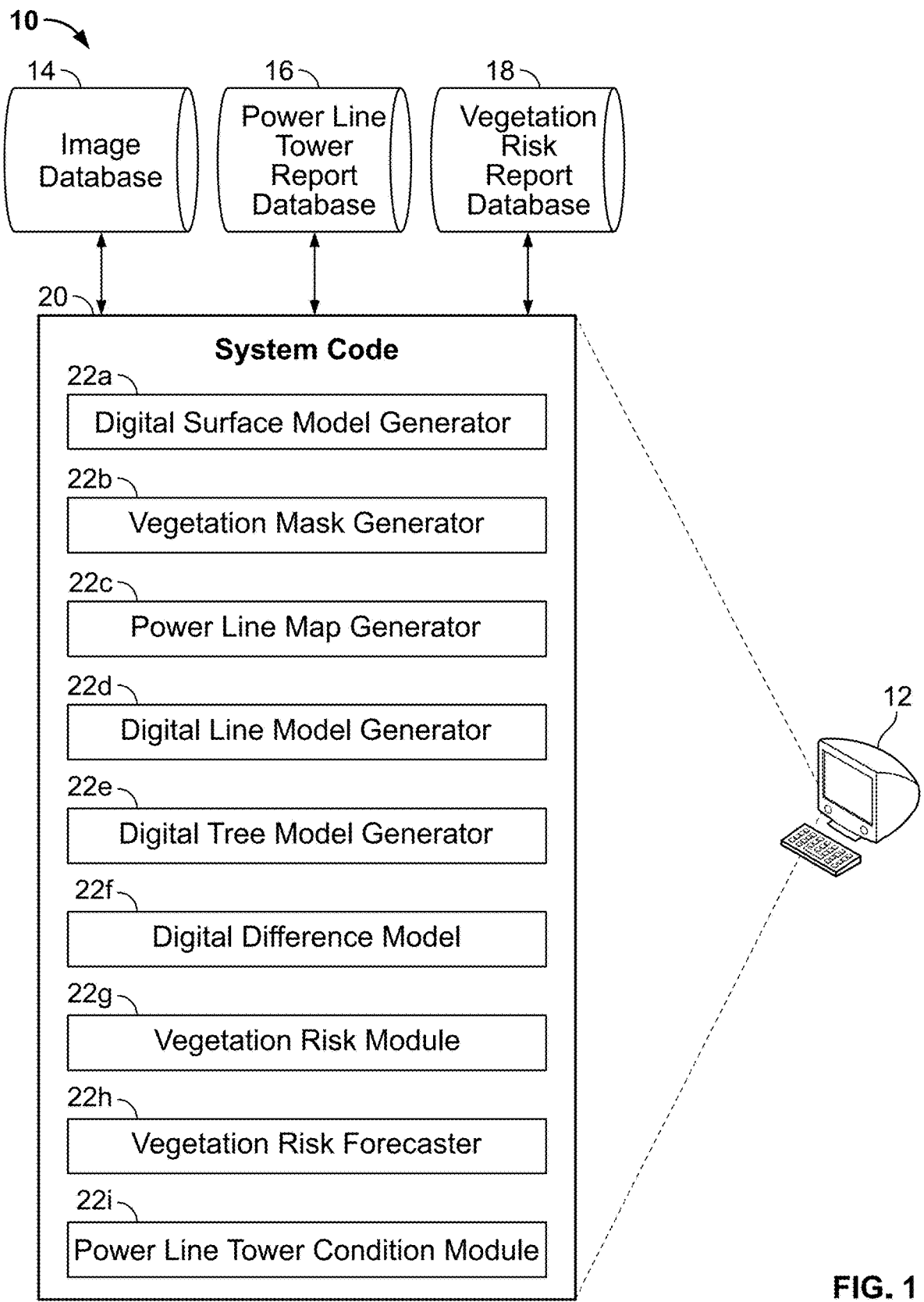
FIG. 1 is a diagram illustrating an embodiment of the system of the present disclosure.

Turning to the drawings, FIG. 1 is a diagram illustrating an embodiment of the system 10 of the present disclosure. The system 10 could be embodied as a central processing unit 12 (processor) in communication with an image database 14, a power line tower report database 16 and/or a vegetation risk report database 18. The processor 12 could include, but is not limited to, a computer system, a server, a personal computer, a cloud computing device, a smart phone, or any other suitable device programmed to carry out the processes disclosed herein. The system 10 could generate a digital surface model based on at least one image obtained from the image database 14. Alternatively, as discussed below, the system 10 could retrieve at least one digital surface model from a third party provider.

The image database 14 could include digital images and/or digital image datasets comprising aerial nadir and/or oblique images, unmanned aerial vehicle images or satellite images, etc. Further, the datasets could include, but are not limited to, images of rural, urban, residential and commercial areas. The image database 14 could store one or more three-dimensional (3D) representations of an imaged location (including objects and/or structures at the location), such as 3D point clouds, LiDAR files, etc., and the system 10 could operate with such 3D representations. As such, by the terms "image" and "imagery" as used herein, it is meant not only optical imagery (including aerial and satellite imagery), but also three-dimensional imagery and computer-generated imagery, including, but not limited to, LiDAR, point clouds, 3D images, etc. The processor 12 executes system code 20 which detects power line hazards from imagery based on at least one image obtained from the image database 14 having an object and/or structure (e.g., a power line, a power line tower, trees, etc.) present therein. Additionally, the system code 20 can generate a power line tower condition report and a vegetation risk report which can be respectively stored in the power line tower report database 16 and the vegetation risk report database 18.

The system 10 includes system code 20 (non-transitory, computer-readable instructions) stored on a computer-readable medium and executable by the hardware processor 12 or one or more computer systems. The code 20 could include various custom-written software modules that carry out the steps/processes discussed herein, and could include, but is not limited to, a digital surface model generator 22a, a vegetation mask generator 22b, a power line map generator 22c, a digital line model generator 22d, a digital tree model generator 22e, a digital difference model 22f, a vegetation risk module 22g, a vegetation risk forecaster 22h and a power line tower condition module 22i. The code 20 could be programmed using any suitable programming languages including, but not limited to, C, C++, C#, Java, Python or any other suitable language. Additionally, the code 20 could be distributed across multiple computer systems in communication with each other over a communications network, and/or stored and executed on a cloud computing platform and remotely accessed by a computer system in communication with the cloud platform. The code 20 could communicate with the image database 14, the power line tower database 16 and/or the vegetation risk report database, which could be stored on the same computer system as the code 20, or on one or more other computer systems in communication with the code 20.

Still further, the system 10 could be embodied as a customized hardware component such as a field-programmable gate array ("FPGA"), application-specific integrated circuit ("ASIC"), embedded system, or other customized hardware components without departing from the spirit or scope of the present disclosure. Additionally, the system 10 can be a vegetation management system and could be embodied as software or a website application that integrates the aforementioned software and hardware components and provides for storing, managing, tracking and informing a user of current, past and future (e.g., forecasted) risks associated with a proximity of vegetation to a power line. The vegetation management system could additionally include a graphical user interface (GUI) for a user to utilize and manage system tools and data, provide inputs, retrieve outputs and/or results, and analyze the outputs and/or results. The vegetation management system could also include one or more custom-written software modules and/or hardware components to determine one or more two-dimensional (2D) risk distances, elevation risk distances and 3D risk distances indicative of distances between a power line and vegetation proximate to the power line, evaluate weather conditions, generate an alert and/or mobilization plan in response to damage to a power line to prioritize response efforts and ensure sufficient resources are available and/or in place to mitigate the damage to the power line, and view, analyze and manipulate imagery obtained from the image database 14. It should be understood that FIG. 1 is only one potential configuration, and the system 10 of the present disclosure can be implemented using a number of different configurations.

Figure 2:
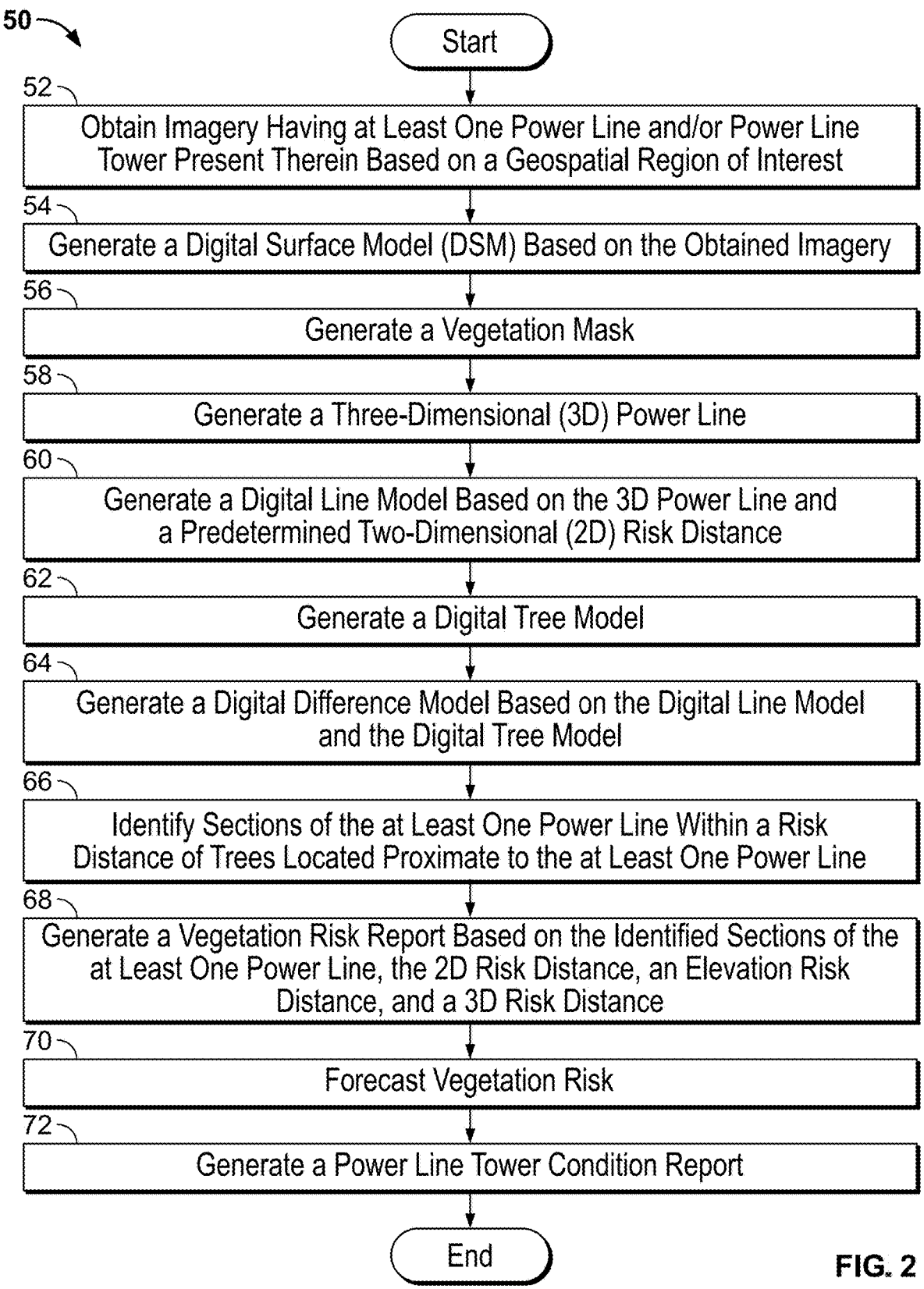
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 obtains at least one image from the image database 14 having an object and/or a structure (e.g., a power line, a power line tower, trees, etc.) present therein based on a geospatial region of interest as described in detail below with respect to FIG. 6.

Figure 3:
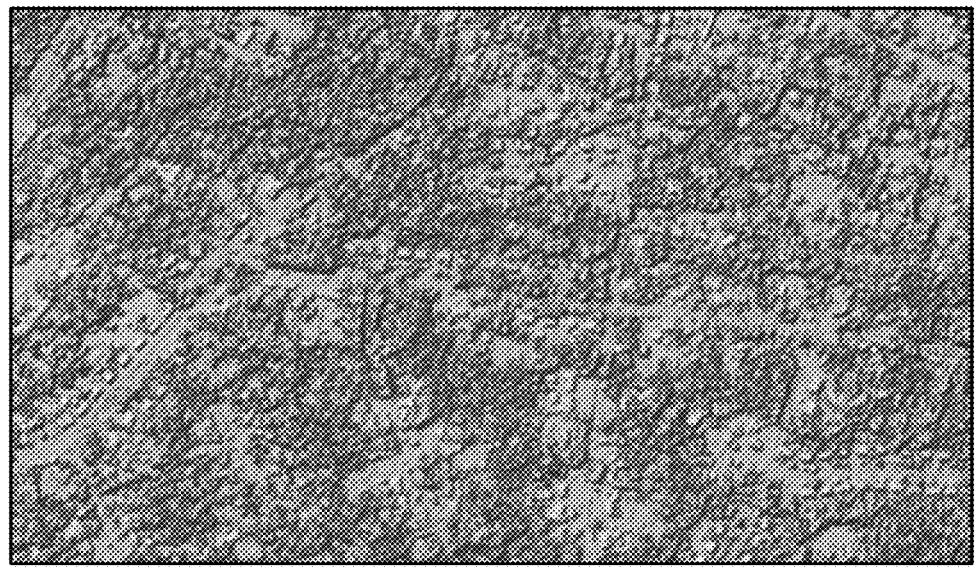
FIG. 3 is a diagram illustrating a digital surface model.

In step 54, the system 10 generates a digital surface model (DSM) based on the obtained image. A DSM refers to a 3D computer graphics representation of elevation data associated with an image and is indicative of terrain and objects and/or structures present therein. For example, FIG. 3 is a diagram 100 illustrating a DSM. The system 10 can generate a DSM from digital images and/or digital image datasets comprising aerial nadir and/or oblique images, unmanned aerial vehicle images or satellite images, etc. The digital image datasets could include, but are not limited to, images of rural, urban, residential and commercial areas. As described above, the image database 14 could store one or more 3D representations of an imaged location (including objects and/or structures at the location), such as 3D point clouds, LiDAR files, Radar files, etc., and the system 10 could generate the DSM with such three-dimensional representations. As such, by the terms "image" and "imagery" as used herein, it is meant not only optical imagery (including aerial and satellite imagery), but also three-dimensional imagery and computer-generated imagery. It should be understood that the system 10 could obtain a DSM from a third party provider.

Figure 4:
FIG. 4 is a diagram illustrating a vegetation mask.

In step 56, the system 10 generates a vegetation mask. The vegetation mask can be a 2D computer graphics representation of vegetation data indicative of tree coverage. For example, FIG. 4 is a diagram 120 illustrating a vegetation mask indicative of tree coverage 122 proximate to a power line 124. The system 10 can generate a vegetation mask from a polygonized classification of a 3D point cloud constructed from stored digital images and/or digital image datasets or LiDAR files in the image database 14. The system 10 could also utilize an image classification algorithm, a computer vision algorithm or a neural network algorithm to execute polygonized image segmentation to generate the vegetation mask. It should be understood that the system 10 could obtain a vegetation mask from a third party provider.

In step 58, the system 10 generates a 3D power line. The 3D power line can be a 3D computer graphics representation of a line indicative of a power line (e.g., a transmission power line or a distribution power line). The system 10 can generate the 3D power line based on a vectorized classification of a 3D point cloud constructed from stored digital images and/or digital image datasets or LiDAR files in the image database 14. The system 10 could also utilize an image classification algorithm, a computer vision algorithm or a neural network algorithm to detect and aggregate 3D vectors associated with aerial nadir and/or oblique images stored in the image database 14. It should be understood that the system 10 could obtain a 3D power line from a third party provider.

Figure 5:
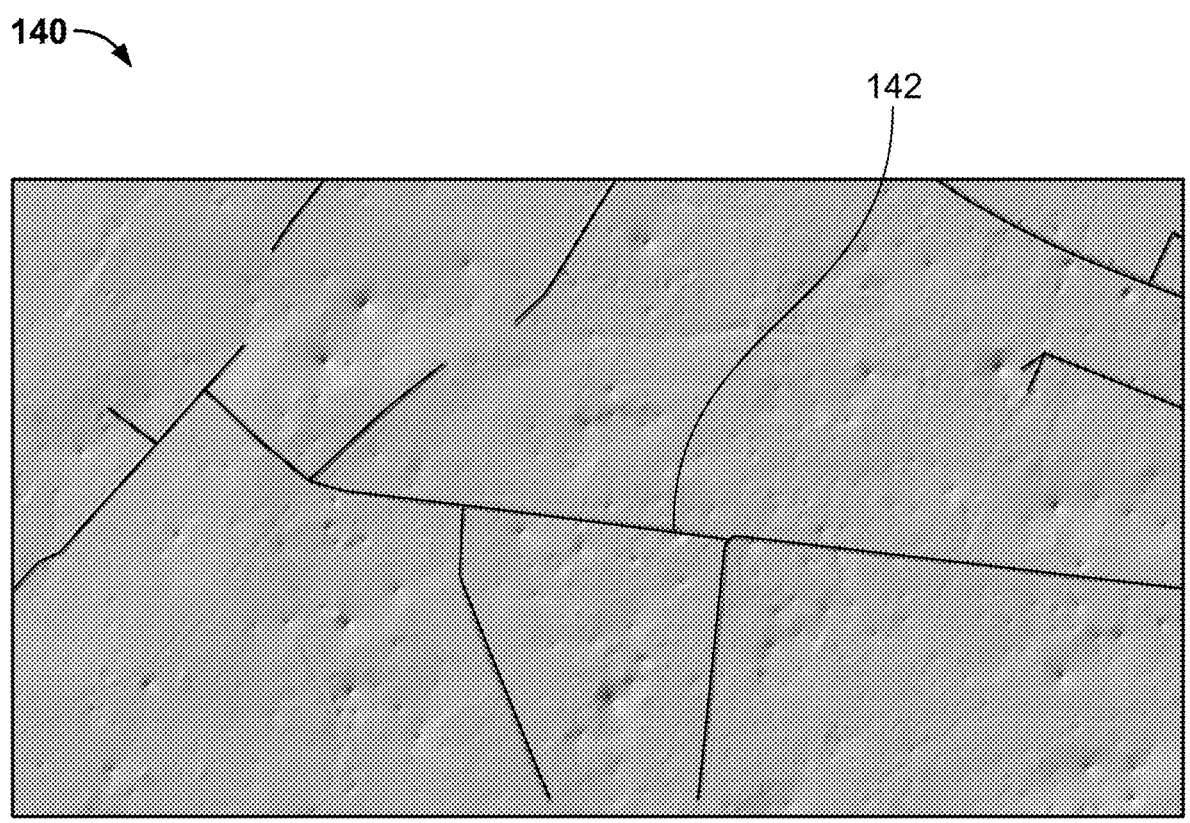
FIG. 5 is a diagram illustrating a digital line model.

In step 60, the system 10 generates a digital line model based on the generated 3D power line and a predetermined 2D risk distance indicative of a distance between the 3D power line and tree coverage proximate to the 3D power line. The digital line model can be a 3D computer graphics representation of elevation data indicative of at least one power line extended in width per the predetermined 2D risk distance. For example, FIG. 5 is a diagram 140 illustrating a digital line model having a plurality of power lines 142. It should be understood that the system 10 can optionally determine a 3D cylindrical buffer around a power line based on the generated 3D power line and a predetermined 3D risk distance indicative of a distance between the 3D power line and tree coverage proximate to the 3D power line.

In step 62, the system 10 generates a digital tree model. The digital tree model can be a 3D computer graphics representation of elevation data indicative of trees and/or tree coverage. In particular, the system 10 can generate the digital tree model based on the DSM and the vegetation mask. Then, in step 64, the system 10 generates a digital difference model based on the digital line model and the digital tree model as described in detail below with respect to FIG. 7. In step 66, the system 10 identifies sections of a power line within a risk distance of trees located proximate to the power line as described in detail below with respect to FIG. 8.

Next, in step 68, the system 10 generates a vegetation risk report. In particular, the system 10 generates the vegetation risk report based on the identified sections of the power line, the predetermined 2D risk distance, the predetermined 3D risk distance and an elevation risk distance. The vegetation risk report can include information associated with a risk to a power line from vegetation proximate to the power line including, but not limited to, a location of the risk, a distance of a tree and/or tree coverage to the power line, and an estimated severity of the risk. Additionally, the vegetation risk report can include a cost of mitigating the risk and a recommended type of mitigation (e.g., herbicide, trimming vegetation from the ground, trimming vegetation from a bucket lift, trimming vegetation from the air, etc.). The vegetation risk report can also include an estimation of proclivity for tree branch and/or tree limb loss and other tree risk (e.g., falling) based on a type and/or age of a tree and local weather and climate conditions. The system 10 can store the vegetation risk report in the vegetation risk report database 18 and integrate the vegetation risk report into the vegetation management system as described above.

Figures 9, 10:
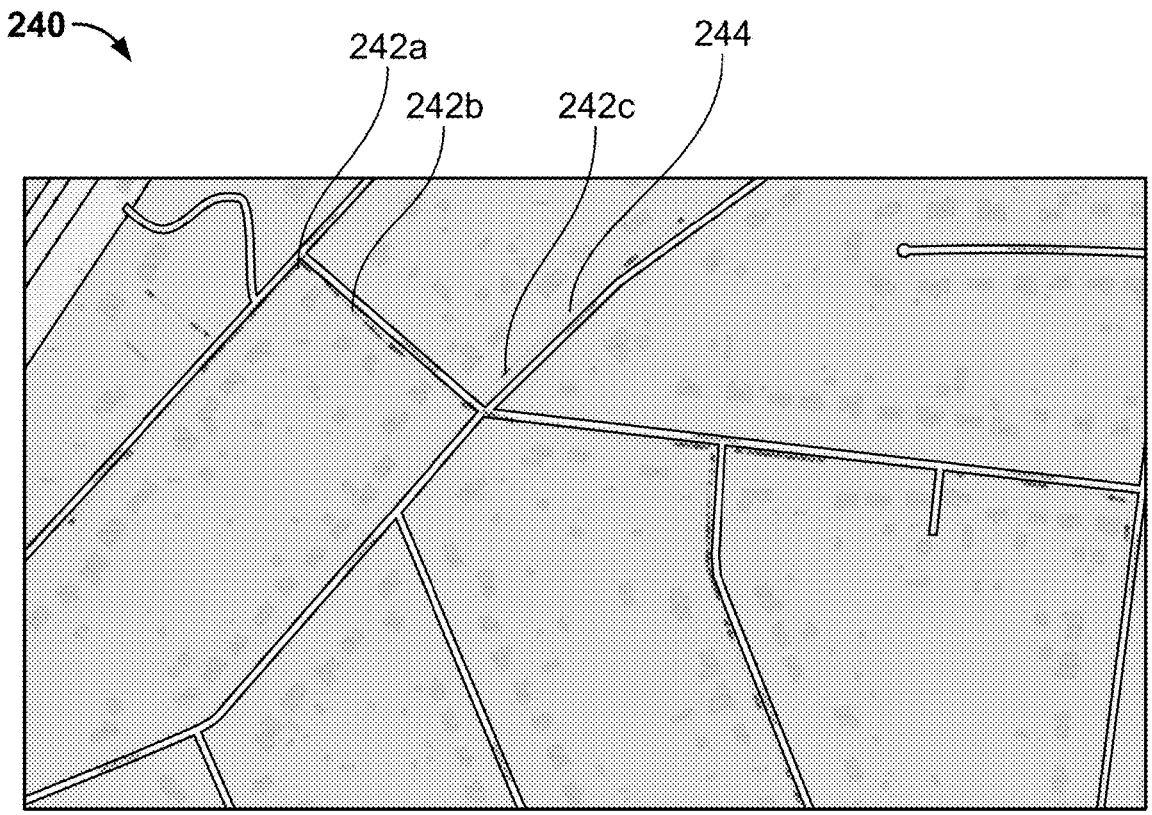
FIG. 9 is a diagram illustrating an embodiment of a vegetation risk report.
FIG. 10 is a diagram illustrating another embodiment of a vegetation risk report.

It should be understood that the vegetation risk report can be a table or a visual representation (e.g., a map) including a portion of or all of the aforementioned information. For example, FIG. 9 is a diagram 220 illustrating a vegetation risk report as a table. In particular, the vegetation risk report illustrates a risk severity associated with identified sections of a power line based on a total length of the power line. As shown in FIG. 9, a critical risk 222a is associated with 8,329 feet of the power line 224a, a high risk 222b is associated with 7,546 feet of the power line 224b, a low risk 222c is associated with 9,182 feet of the power line 224c, and no risk 222d is associated with 85,059 feet of the power line 224d. In another example, FIG. 10 is a diagram 240 illustrating the vegetation risk report as a map. In particular, the map illustrates a risk severity, including a critical risk 242a, a high risk 242b and a low risk 242c, associated with identified sections of a power line 244.

In step 70, the system 10 forecasts a vegetation risk as described in detail below with respect to FIG. 11. In step 72, the system 10 generates a power line tower condition report as described in detail below with respect to FIGS. 12 and 13.

Figure 6:
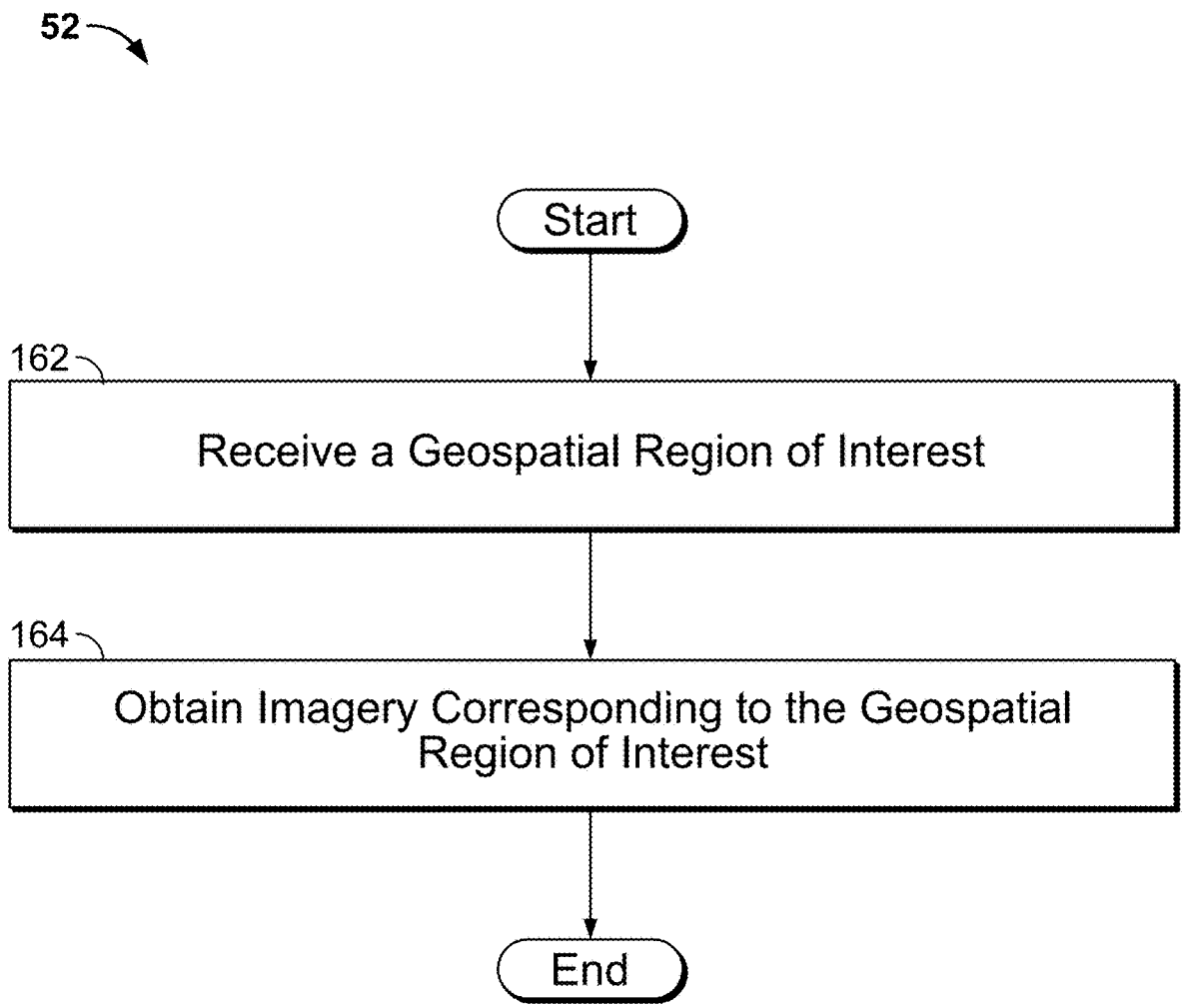
FIG. 6 is a flowchart illustrating step 52 of FIG. 2 in greater detail.

FIG. 6 is a flowchart illustrating step 52 of FIG. 2 in greater detail. Beginning in step 162, the system 10 receives a geospatial region of interest (ROI) specified by a user. For example, a user can input latitude and longitude coordinates of an ROI. Alternatively, a user can input an address or a world point of an ROI. The geospatial ROI can be represented by a generic polygon enclosing a geocoding point indicative of the address or the world point. The region can be of interest to the user because of one or more structures present in the region. A property parcel included within the ROI can be selected based on the geocoding point. A deep learning neural network can be applied over the area of the parcel to detect a structure or a plurality of structures situated thereon.

The geospatial ROI can also be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art would understand that other methods can be used to determine the bound of the polygon. The ROI may be represented in any computer format, such as, for example, well-known text ("WKT") data, TeX data, HTML data, XML data, etc. For example, a WKT polygon can comprise one or more computed independent world areas based on the detected structure in the parcel.

In step 164, after the user inputs the geospatial ROI, the system 10 obtains at least one image associated with the geospatial ROI from the image database 14. As mentioned above, the images can be digital images such as aerial images, satellite images, etc. However, those skilled in the art would understand that the image can be any type of image (e.g. an aerial nadir or oblique image) captured by any type of image capture source. For example, aerial images can be captured by image capture sources including, but not limited to, a plane, a helicopter, a paraglider, a satellite, or an unmanned aerial vehicle. It should be understood that multiple images can overlap all or a portion of the geospatial ROI and that the images can be orthorectified and/or modified if necessary.

Figure 7:
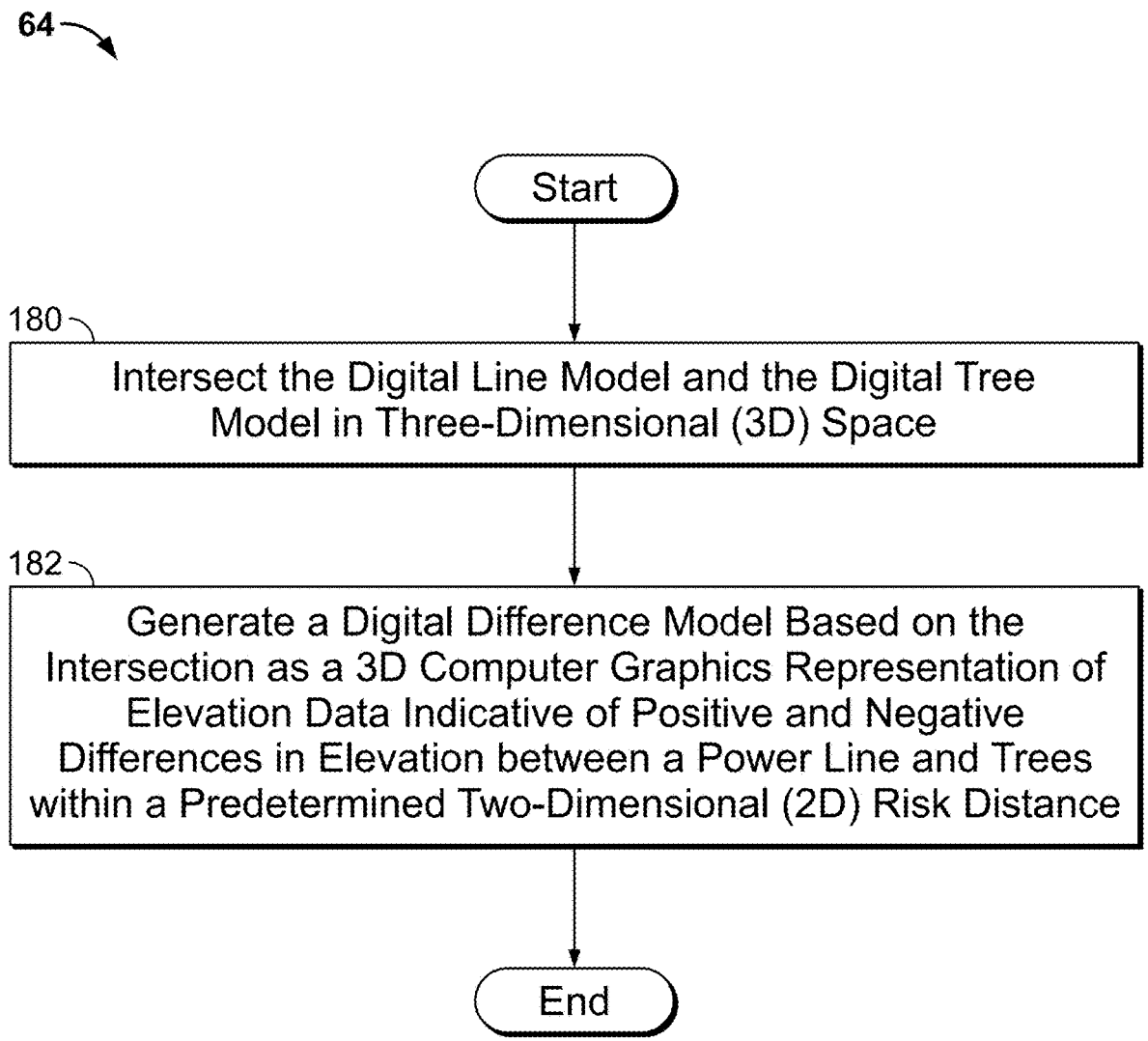
FIG. 7 is a diagram illustrating step 64 of FIG. 2 in greater detail.

FIG. 7 is a flowchart illustrating step 64 of FIG. 2 in greater detail. In step 180, the system 10 intersects the digital line model and the digital tree model in 3D space. Then, in step 182, the system 10 generates a digital difference model based on the intersection. The digital difference model can be a 3D computer graphics representation of elevation data indicative of positive and negative differences in elevation between a power line and vegetation (e.g., trees) within a predetermined 2D risk distance.

Figure 8:
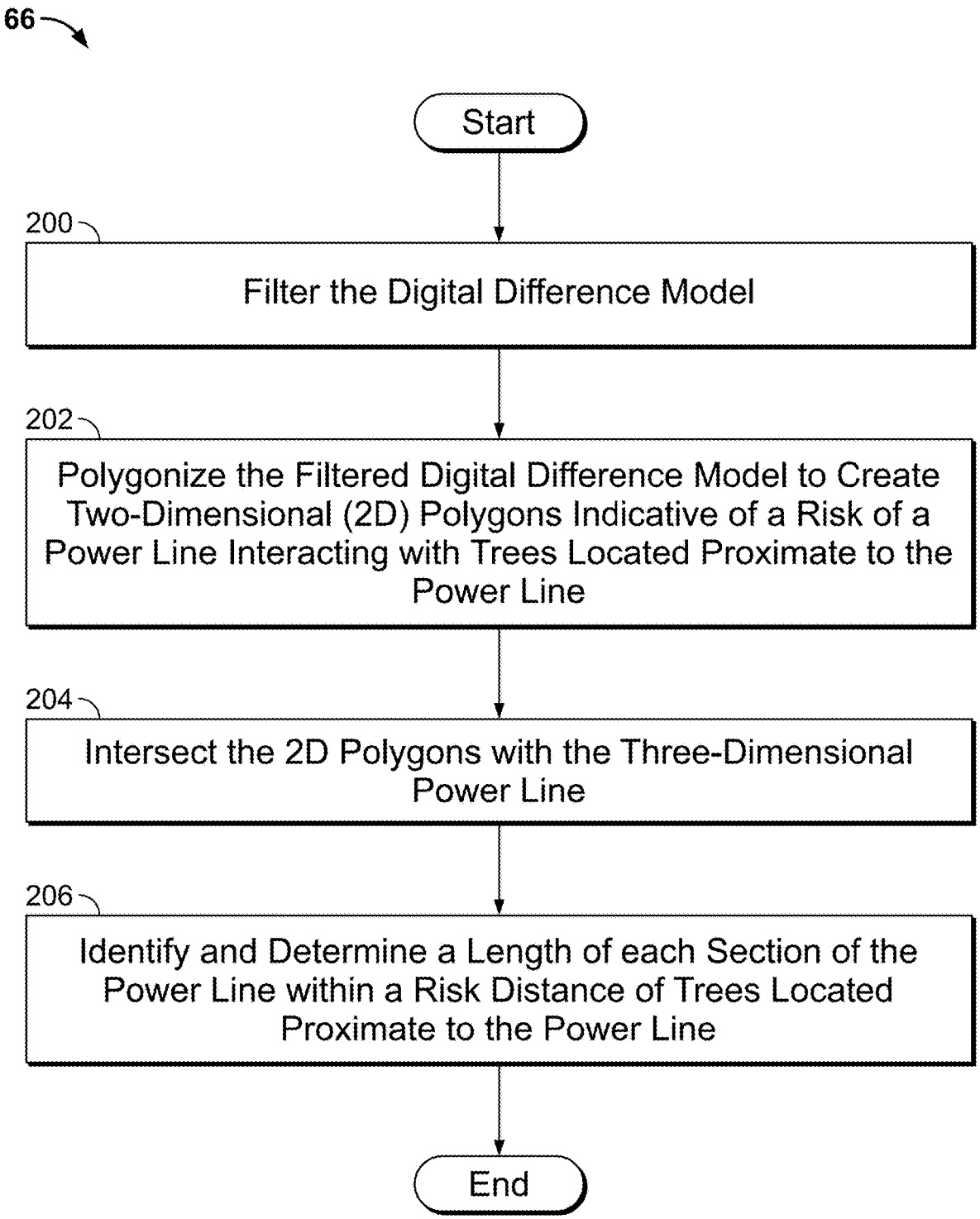
FIG. 8 is a flowchart illustrating step 66 of FIG. 2 in greater detail.

FIG. 8 is a flowchart illustrating step 66 of FIG. 2 in greater detail. In step 200, the system 10 filters the digital difference model. In particular, the system 10 filters the digital difference model by removing data outside of one or more predetermined elevation risk distances. In step 202, the system 10 polygonizes the filtered digital difference model to create 2D polygons indicative of a risk of a power line interacting with trees located proximate to the power line. Then, in step 204, the system 10 intersects the 2D polygons with the 3D power line. Lastly, in step 206, the system 10 identifies and determines a length of each section of the power line within a risk distance of trees located proximate to the power line.

Figure 11:
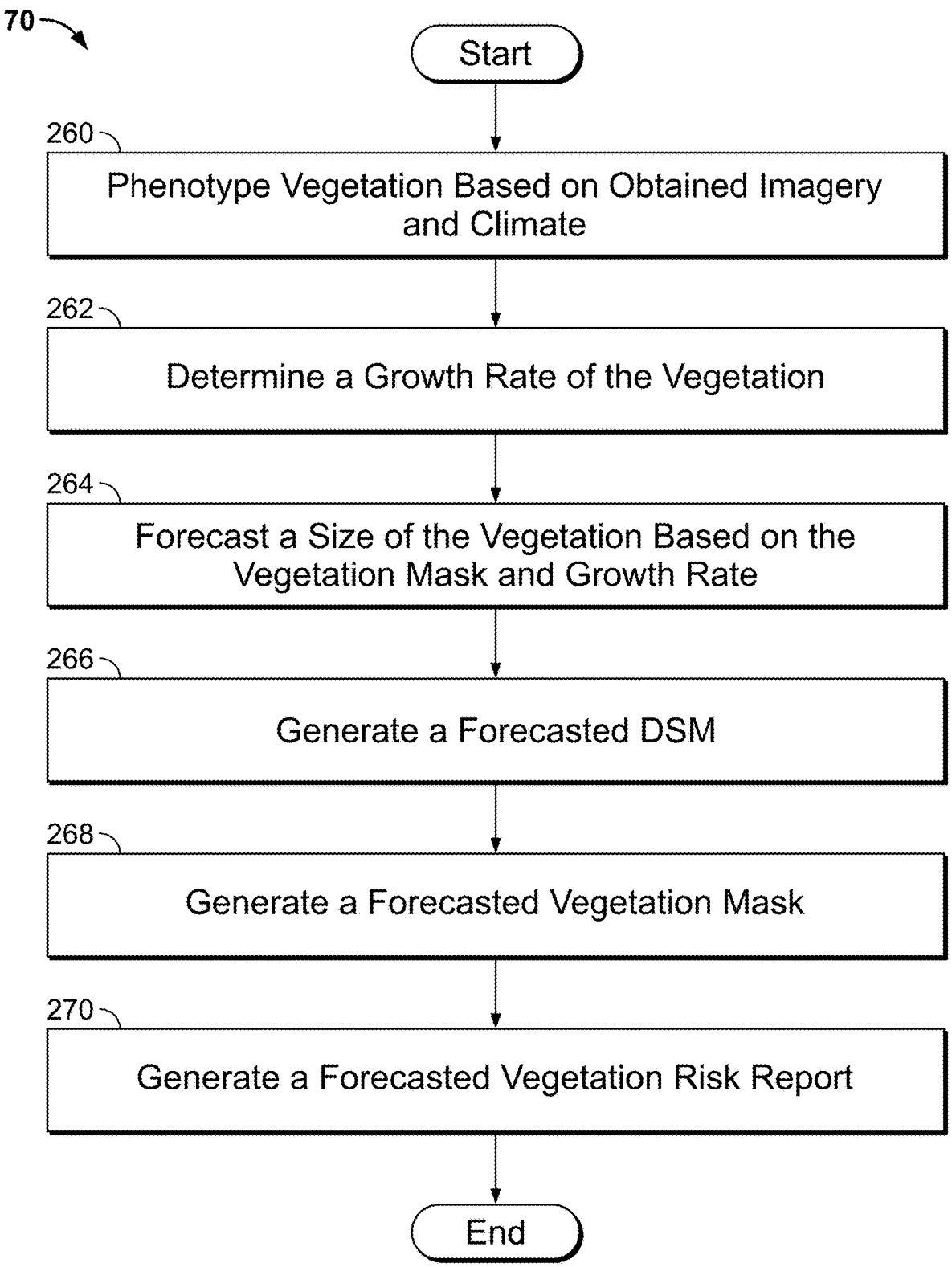
FIG. 11 is a flowchart illustrating step 70 of FIG. 2 in greater detail.

FIG. 11 is a flowchart illustrating step 70 of FIG. 2 in greater detail. In step 260, the system 10 phenotypes vegetation based on at least one obtained image from the image database 14 having an object and/or a structure (e.g., a power line, a power line tower, trees, etc.) present therein and a climate associated with obtained image. As described above, the image database 14 can include digital images and/or digital image datasets comprising aerial nadir and/or oblique images, unmanned aerial vehicle images or satellite images, etc. where the datasets could include, but are not limited to, images of rural, urban, residential and commercial areas. In step 262, the system 10 determines a growth rate of the vegetation. In particular, the system 10 determines a vegetation growth rate by applying a formula based on the phenotype. Alternatively, the system 10 can determine the vegetation growth rate by comparing a vegetation mask between two images. In step 264, the system 10 forecasts a size of the vegetation (e.g., a height of a tree) at a predetermined time in the future based on the vegetation mask and the growth rate. Then, in steps 266 and 268, the system 10 respectively generates a forecasted DSM and a forecasted vegetation mask based on the forecasted size of the vegetation. In step 270, the system 10 generates a forecasted vegetation risk report by applying processing steps 58-68 described above with respect to FIG. 2.

Figure 12:
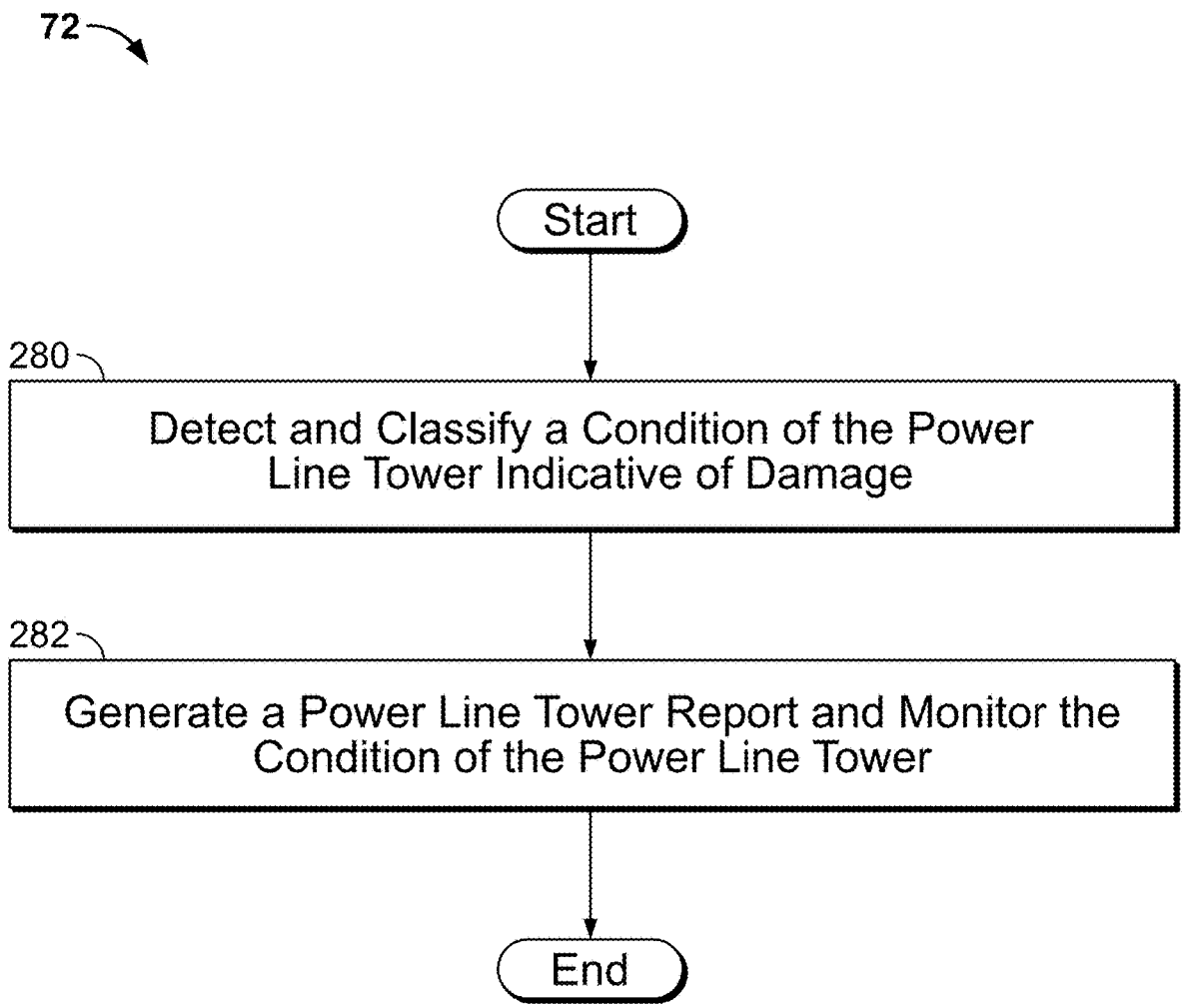
FIG. 12 is a flowchart illustrating step 72 of FIG. 2 in greater detail.
Figure 13:
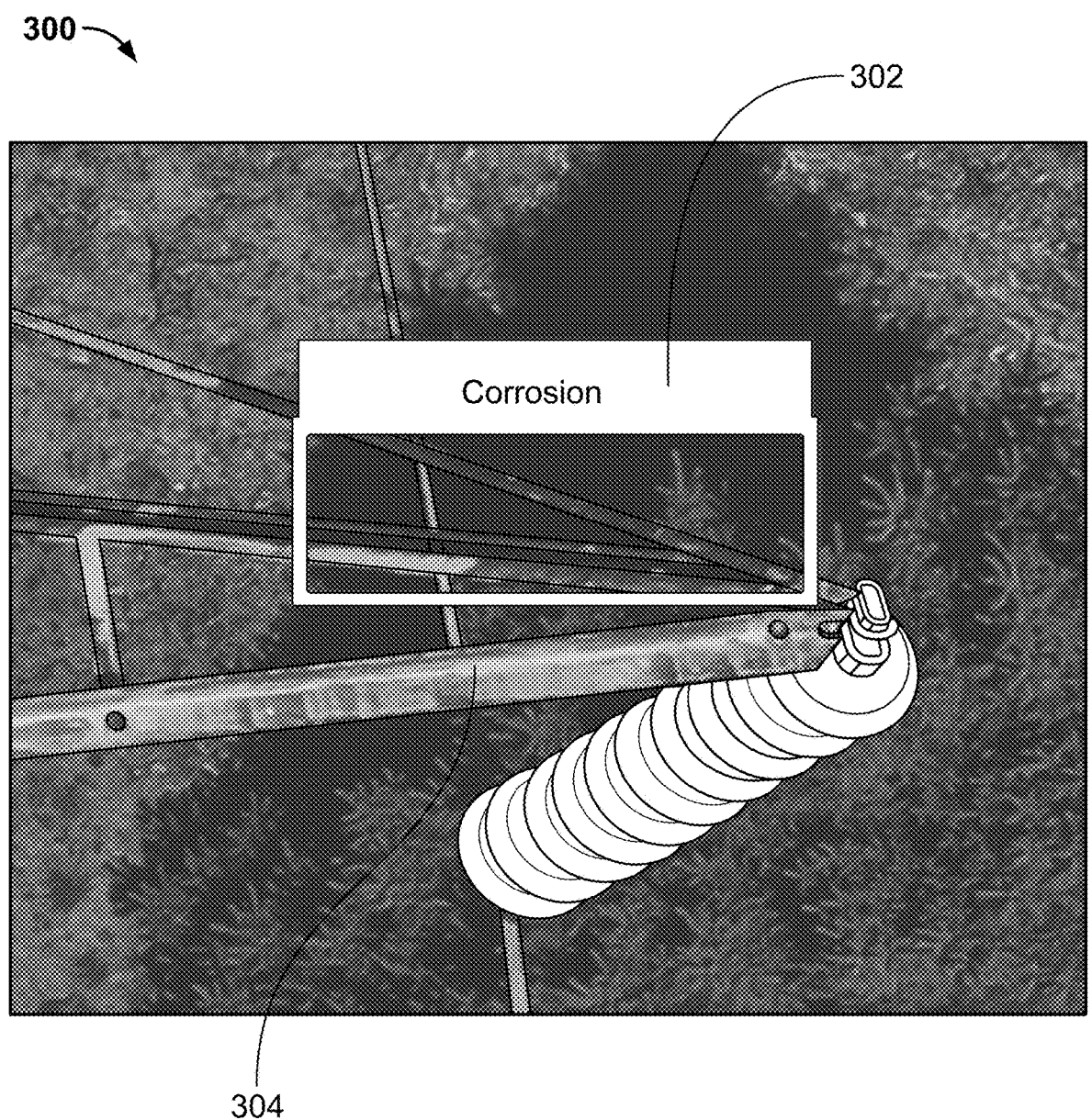
FIG. 13 is a diagram illustrating a graphical power line tower condition report.

FIG. 12 is a flowchart illustrating step 72 of FIG. 2 in greater detail. In step 280, the system 10 utilizes an artificial intelligence algorithm to automatically detect and classify a condition of a power line tower present in at least one image obtained from the image database 14. It should be understood that the system 10 can utilize any algorithm suitable for detecting and classifying a condition of a power line tower. The condition of the power line tower can be determined based on different types of damage sustained by the power line tower including, but not limited to, natural damage (e.g., corrosion, fire, wind, etc.) and/or artificial damage (e.g., graffiti and theft). In step 282, the system 10 generates a power line tower report indicative of the condition of the power line tower and monitors a condition of the power line tower over time via the vegetation management system. For example, FIG. 13 is a diagram 300 illustrating a graphical tower condition report indicative of corrosion 302 sustained by a portion of a power line tower 304.

Figure 14:
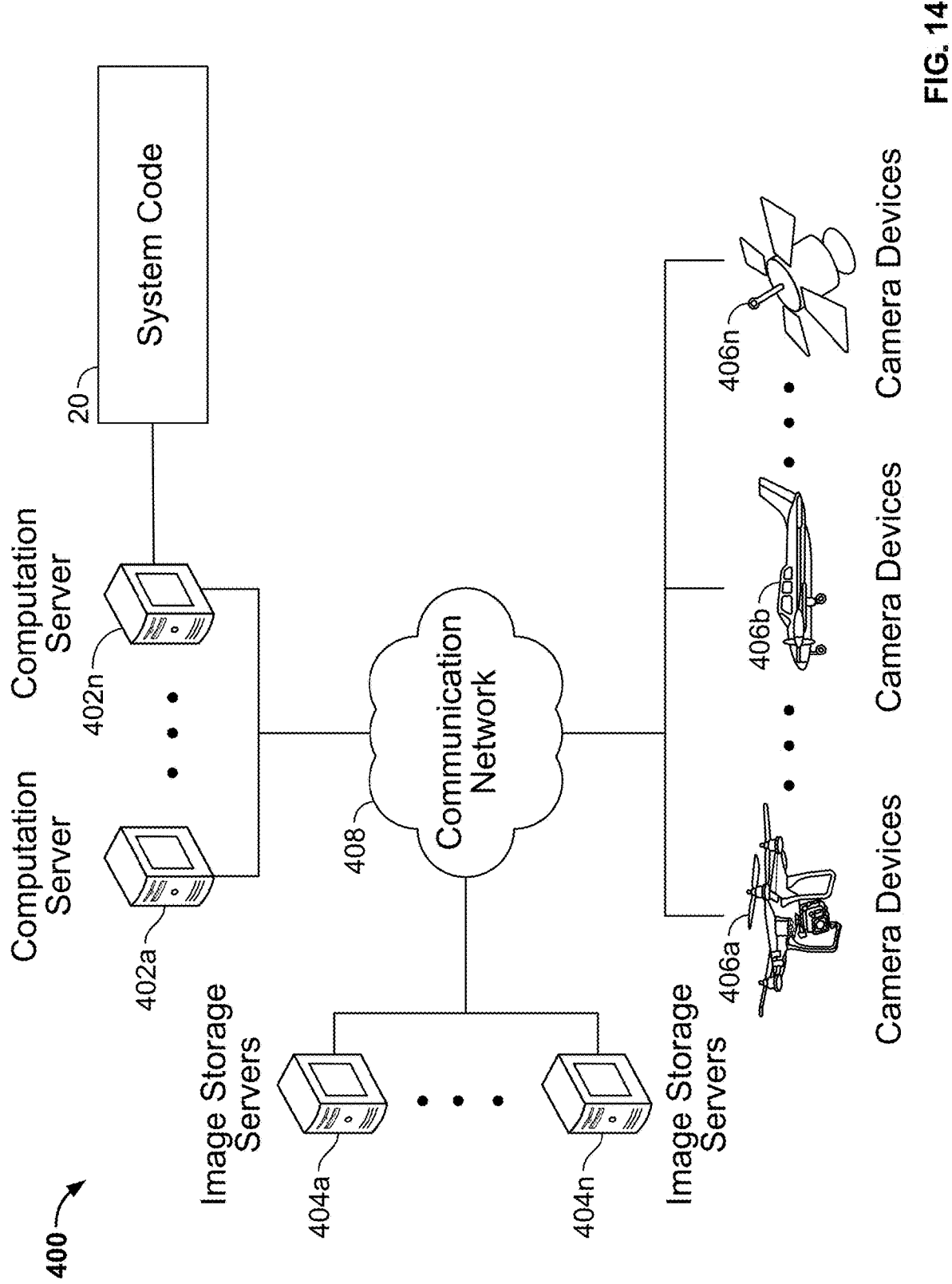
FIG. 14 is a diagram illustrating another embodiment of the system of the present disclosure.

FIG. 14 a diagram illustrating another embodiment of the system 400 of the present disclosure. In particular, FIG. 14 illustrates additional computer hardware and network components on which the system 400 could be implemented. The system 400 can include a plurality of computation servers 402a-402n having at least one processor and memory for executing the computer instructions and methods described above (which could be embodied as system code 20). The system 400 can also include a plurality of image storage servers 404a-404n for receiving image data and/or video data. The system 400 can also include a plurality of camera devices 406a-406n for capturing image data and/or video data. For example, the camera devices can include, but are not limited to, an unmanned aerial vehicle 406a, an airplane 406b, and a satellite 406n. The computation servers 402a-402n, the image storage servers 404a-404n, and the camera devices 406a-406n can communicate over a communication network 408. Of course, the system 400 need not be implemented on multiple devices, and indeed, the system 400 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for detecting power line hazards from imagery, comprising:
   a memory storing at least one image having at least one power line or a power line tower present in the image; and
   a processor in communication with the memory, the processor programmed to perform the steps of:
      receiving the at least one image from the memory;
      processing the at least one image to generate a digital surface model;
      generating a vegetation mask;
      generating a three-dimensional representation of a power line;
      generating a digital line model based on the three-dimensional representation of the power line and a two-dimensional risk distance;
      generating a digital tree model;
      generating a digital difference model based on the digital line model and the digital tree model;
      identifying sections of the power line within a risk distance of trees located proximate to the power line;
      generate a vegetation risk report;
      forecast a vegetation risk; and
      generate a power line tower condition report,
   wherein the step of identifying sections of the power line comprises filtering the digital difference model, and
   wherein the step of identifying sections of the power line comprises polygonizing the filtered digital difference model to create two-dimensional power lines indicative of a risk of a power line interacting with trees located proximate to the power line.

2. The system of claim 1, wherein the step of receiving the at least one image comprises receiving a geospatial region of interest and obtaining the at least one image based on the geospatial region of interest.

3. The system of claim 1, wherein the step of generating the digital difference model comprises intersecting the digital line model and the digital tree model in a three-dimensional space.

4. The system of claim 3, wherein the step of generating the digital difference model comprises generating the digital difference model based on the intersection as a three-dimensional computer graphics representation of elevation data.

5. The system of claim 4, wherein the three-dimensional elevation data is indicative of positive and negative differences in elevation between the power line and trees within a predetermined two-dimensional risk distance.

6. The system of claim 1, wherein the step of identifying sections of the power line comprises intersecting the two-dimensional polygons with the three-dimensional representation of the power line.

7. The system of claim 6, wherein the step of identifying sections of the power line comprises identifying and determining a length of each section of the power line within a risk distance of trees located proximate to the power line.

8. The system of claim 1, wherein the step of forecasting vegetation risk comprises phenotyping vegetation based on obtained imagery and climate.

9. The system of claim 8, wherein the step of forecasting vegetation risk comprises determining a growth rate of the vegetation.

10. The system of claim 9, wherein the step of forecasting the vegetation risk comprises forecasting a size of the vegetation based on the vegetation mask and the growth rate.

11. The system of claim 10, wherein the step of forecasting the vegetation risk comprises generating a forecasted digital surface model, a forecasted vegetation mask, and a forecasted vegetation risk report.

12. The system of claim 1, wherein the step of generating the power line tower condition report comprises detecting and classifying a condition of the power line tower indicative of the damage.

13. The system of claim 12, wherein the step of generating the power line tower condition report comprises monitoring the condition of the power line tower.

14. A computer vision method for detecting power line hazards from imagery, comprising the steps of:
 receiving by a processor at least one image stored in a memory;
 processing the at least one image to generate a digital surface model;
 generating a vegetation mask;
 generating a three-dimensional representation of a power line;
 generating a digital line model based on the three-dimensional representation of the power line and a two-dimensional risk distance;
 generating a digital tree model;
 generating a digital difference model based on the digital line model and the digital tree model;
 identifying sections of the power line within a risk distance of trees located proximate to the power line;
 generate a vegetation risk report;
 forecast a vegetation risk; and
 generate a power line tower condition report,
 wherein the step of identifying sections of the power line comprises filtering the digital difference model, and wherein the step of identifying sections of the power line comprises polygonizing the filtered digital difference model to create two-dimensional power lines indicative of a risk of a power line interacting with trees located proximate to the power line.

15. The method of claim 14, wherein the step of receiving the at least one image comprises receiving a geospatial region of interest and obtaining the at least one image based on the geospatial region of interest.

16. The method of claim 14, wherein the step of generating the digital difference model comprises intersecting the digital line model and the digital tree model in a three-dimensional space.

17. The method of claim 16, wherein the step of generating the digital difference model comprises generating the digital difference model based on the intersection as a three-dimensional computer graphics representation of elevation data.

18. The method of claim 17, wherein the three-dimensional elevation data is indicative of positive and negative differences in elevation between the power line and trees within a predetermined two-dimensional risk distance.

19. The method of claim 14, wherein the step of identifying sections of the power line comprises intersecting the two-dimensional polygons with the three-dimensional representation of the power line.

20. The method of claim 19, wherein the step of identifying sections of the power line comprises identifying and determining a length of each section of the power line within a risk distance of trees located proximate to the power line.

21. The method of claim 14, wherein the step of forecasting vegetation risk comprises phenotyping vegetation based on obtained imagery and climate.

22. The method of claim 21, wherein the step of forecasting vegetation risk comprises determining a growth rate of the vegetation.

23. The method of claim 22, wherein the step of forecasting the vegetation risk comprises forecasting a size of the vegetation based on the vegetation mask and the growth rate.

24. The method of claim 23, wherein the step of forecasting the vegetation risk comprises generating a forecasted digital surface model, a forecasted vegetation mask, and a forecasted vegetation risk report.

25. The method of claim 14, wherein the step of generating the power line tower condition report comprises detecting and classifying a condition of the power line tower indicative of the damage.

26. The method of claim 25, wherein the step of generating the power line tower condition report comprises monitoring the condition of the power line tower.

27. A computer vision system for detecting power line hazards from imagery, comprising:
 a memory storing at least one image having at least one power line or a power line tower present in the image; and
 a processor in communication with the memory, the processor programmed to perform the steps of:
 receiving the at least one image from the memory;
 processing the at least one image to generate a digital surface model;
 generating a vegetation mask;
 generating a three-dimensional representation of a power line;
 generating a digital line model based on the three-dimensional representation of the power line and a two-dimensional risk distance;

generating a digital tree model;
generating a digital difference model based on the digital line model and the digital tree model;
identifying sections of the power line within a risk distance of trees located proximate to the power line;
generate a vegetation risk report;
forecast a vegetation risk; and
generate a power line tower condition report,
wherein the step of forecasting vegetation risk comprises phenotyping vegetation based on obtained imagery and climate, and
wherein the step of forecasting vegetation risk comprises determining a growth rate of the vegetation.

28. The system of claim 27, wherein the step of receiving the at least one image comprises receiving a geospatial region of interest and obtaining the at least one image based on the geospatial region of interest.

29. The system of claim 27, wherein the step of generating the digital difference model comprises intersecting the digital line model and the digital tree model in a three-dimensional space.

30. The system of claim 29, wherein the step of generating the digital difference model comprises generating the digital difference model based on the intersection as a three-dimensional computer graphics representation of elevation data.

31. The system of claim 30, wherein the three-dimensional elevation data is indicative of positive and negative differences in elevation between the power line and trees within a predetermined two-dimensional risk distance.

32. The system of claim 27, wherein the step of identifying sections of the power line comprises identifying and determining a length of each section of the power line within a risk distance of trees located proximate to the power line.

33. The system of claim 27, wherein the step of forecasting the vegetation risk comprises forecasting a size of the vegetation based on the vegetation mask and the growth rate.

34. The system of claim 33, wherein the step of forecasting the vegetation risk comprises generating a forecasted digital surface model, a forecasted vegetation mask, and a forecasted vegetation risk report.

35. The system of claim 27, wherein the step of generating the power line tower condition report comprises detecting and classifying a condition of the power line tower indicative of the damage.

36. The system of claim 35, wherein the step of generating the power line tower condition report comprises monitoring the condition of the power line tower.

37. A computer vision method for detecting power line hazards from imagery, comprising the steps of:
receiving by a processor at least one image stored in a memory;
processing the at least one image to generate a digital surface model;
generating a vegetation mask;
generating a three-dimensional representation of a power line;
generating a digital line model based on the three-dimensional representation of the power line and a two-dimensional risk distance;
generating a digital tree model;
generating a digital difference model based on the digital line model and the digital tree model;
identifying sections of the power line within a risk distance of trees located proximate to the power line;
generate a vegetation risk report;
forecast a vegetation risk; and
generate a power line tower condition report,
wherein the step of forecasting vegetation risk comprises phenotyping vegetation based on obtained imagery and climate, and
wherein the step of forecasting vegetation risk comprises determining a growth rate of the vegetation.

38. The method of claim 37, wherein the step of receiving the at least one image comprises receiving a geospatial region of interest and obtaining the at least one image based on the geospatial region of interest.

39. The method of claim 37, wherein the step of generating the digital difference model comprises intersecting the digital line model and the digital tree model in a three-dimensional space.

40. The method of claim 39, wherein the step of generating the digital difference model comprises generating the digital difference model based on the intersection as a three-dimensional computer graphics representation of elevation data.

41. The method of claim 37, wherein the three-dimensional elevation data is indicative of positive and negative differences in elevation between the power line and trees within a predetermined two-dimensional risk distance.

42. The method of claim 37, wherein the step of identifying sections of the power line comprises identifying and determining a length of each section of the power line within a risk distance of trees located proximate to the power line.

43. The method of claim 37, wherein the step of forecasting the vegetation risk comprises forecasting a size of the vegetation based on the vegetation mask and the growth rate.

44. The method of claim 43, wherein the step of forecasting the vegetation risk comprises generating a forecasted digital surface model, a forecasted vegetation mask, and a forecasted vegetation risk report.

45. The method of claim 37, wherein the step of generating the power line tower condition report comprises detecting and classifying a condition of the power line tower indicative of the damage.

46. The method of claim 45, wherein the step of generating the power line tower condition report comprises monitoring the condition of the power line tower.

* * * * *